Jan. 11, 1966  C. J. RENKEN, JR  3,229,197
PULSED ELECTROMAGNETIC FIELD SYSTEM FOR NONDESTRUCTIVE TESTING
Filed Oct. 31, 1961  2 Sheets-Sheet 1
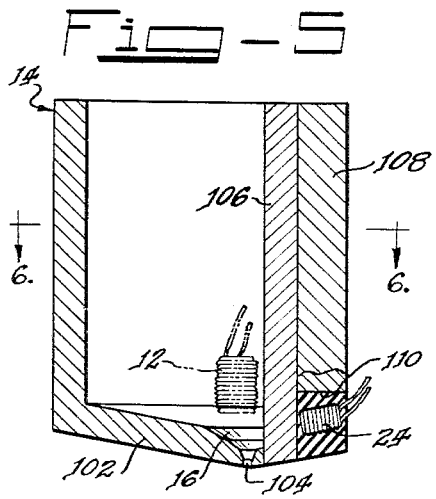
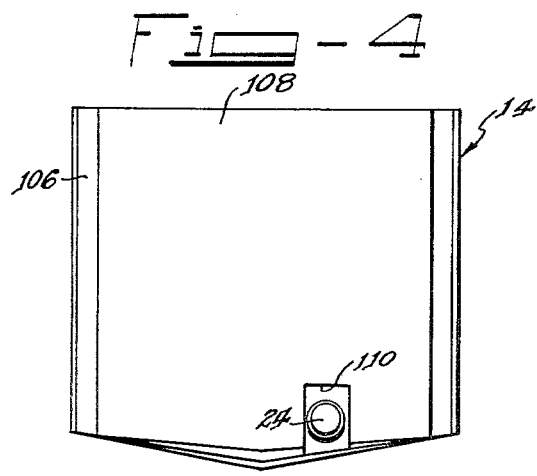
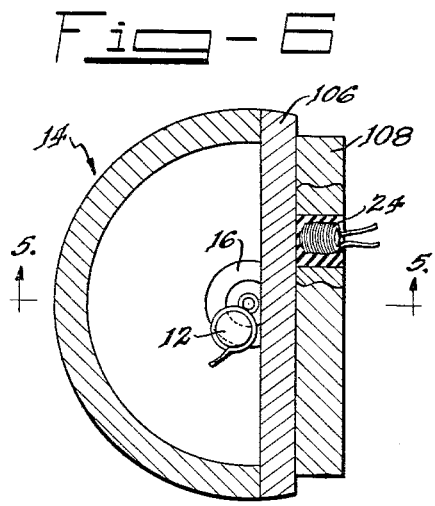
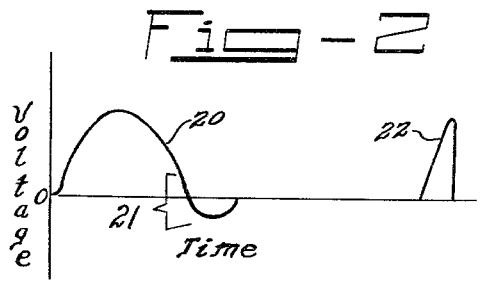
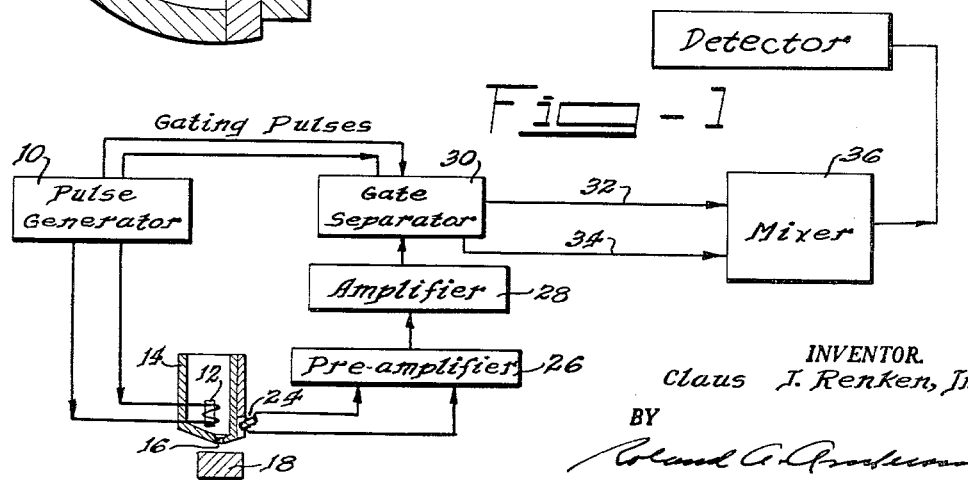
INVENTOR.
Claus J. Renken, Jr.
BY
Roland A. Anderson
Attorney

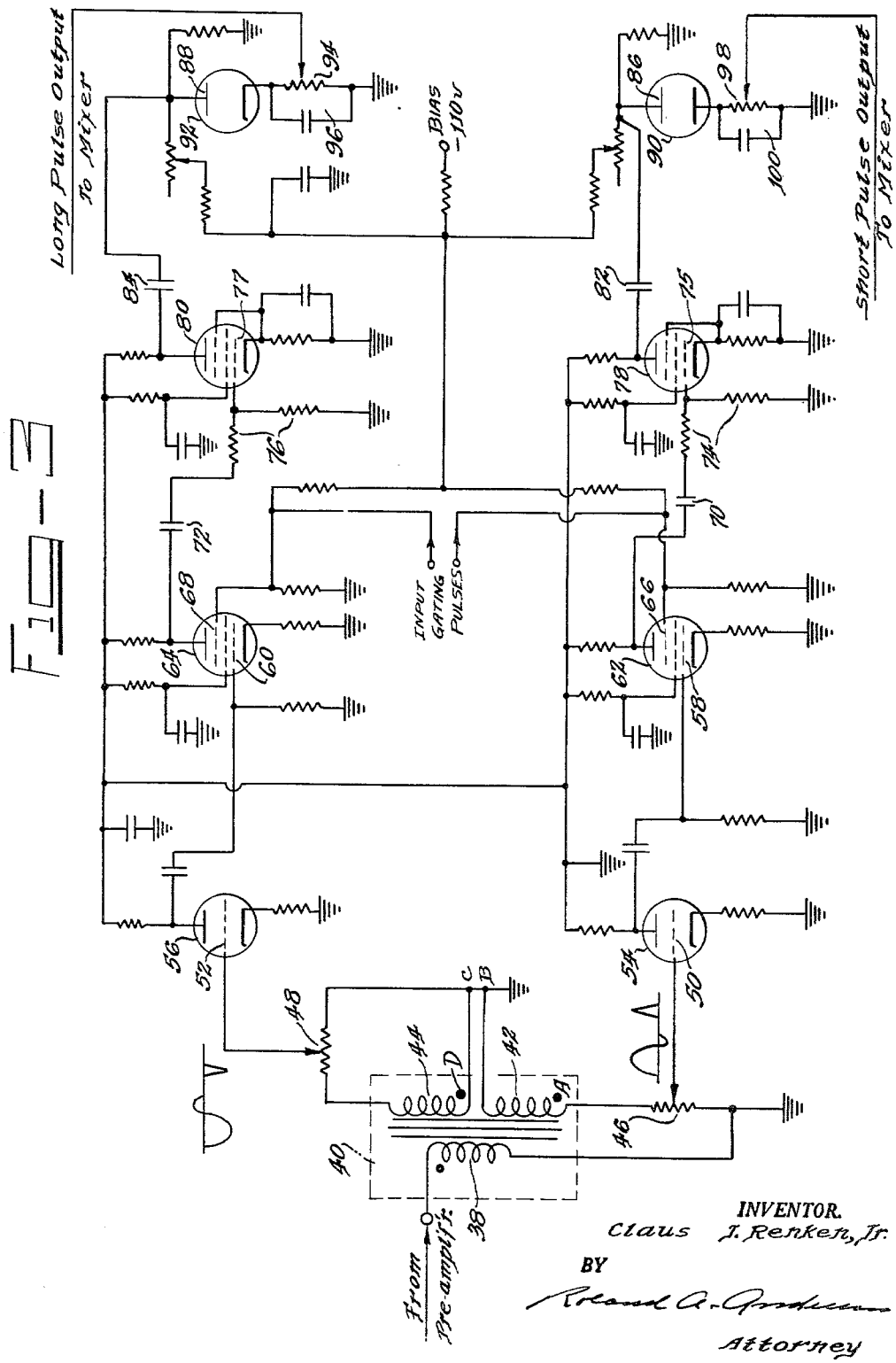

3,229,197
PULSED ELECTROMAGNETIC FIELD SYSTEM FOR NONDESTRUCTIVE TESTING
Claus J. Renken, Jr., Orland Park, Ill., assignor to the United States of America as represented by the United States Atomic Energy Commission
Filed Oct. 31, 1961, Ser. No. 149,129
7 Claims. (Cl. 324—40)

This invention relates to nondestructive testing and more specificially to devices using reflected pulsed electro-magnetic fields from a metal sample to detect subsurface irregularities therein. The invention described herein was made in the course of, or under, a contract with the U.S. Atomic Energy Commission.

Quite often the configuration of a metal sample is such that nondestructive testing for subsurface flaws must be accomplished from one side of the sample. The conventional method of detection under these conditions is applying a C.W. signal to a probe and measuring the effect thereon of eddy currents induced in the sample. This system presents two major problems: (1) the deleterious effects of probe-to-sample space variations and (2) poor resolution. The size of the probe coil has to be rather large in order to handle the high power required to generate a usable received signal and to meet the requirement that the probe be of a high impedance. Thus, since the probe coil is of a large size, the resolution therefrom is correspondingly poor.

Some improvement in resolution has been attained in using pulsed fields. See U.S. Patent 2,965,840. However, again the resolution is still not good and the use thereof is confined to resistivity measurements. This is because the probe coil size has a finite limitation of approximately ¼" in diameter which cannot detect small subsurface flaws in a metal sample.

It is therefore one object of the present invention to provide a device for providing improved resolution in detecting subsurface flaws in a metal sample.

It is another object of the present invention to provide a device for detecting subsurface flaws in a metal sample independent of spatial movement between the device and the metal sample.

It is still another object of the present invention to provide a device for detecting from one side of a metal sample small subsurface flaws therein.

Other objects of the present invention will become more apparent as the detailed description proceeds.

In general, the present invention comprises a means for transmitting pulsed electromagnetic fields of alternate long and short time duration into a test sample. Shielding means are provided to insure narrow high energy pulsed electromagnetic fields. A receiving coil detects the alternate long and short reflected pulsed electromagnetic fields from the metal sample and means are provided for discriminating between the detected long and short reflected pulsed fields to determine the presence of subsurface flaws in the metal sample independent of the spacing variations between the transmitting means and the metal sample.

More complete understanding of the invention will best be obtained from consideration of the accompanying drawings, in which:

FIG. 1 is a block diagram of an apparatus for the present invention.

FIG. 2 is an illustration of typical reflection pulse envelopes for the apparatus of FIGURE 1.

FIG. 3 is an electrical schematic diagram of the amplifier and gate separator of the apparatus in FIGURE 1.

FIG. 4 is a front view of the mask for the embodiment of the apparatus in FIGURE 1.

FIG. 5 is a cross-sectional view of the mask for the embodiment of the apparatus in FIGURE 1 taken on line 5—5 of FIGURE 6.

FIG. 6 is a horizontal cross-section of the mask for the embodiment of the apparatus in FIGURE 1 taken on lines 6—6 of FIGURE 5.

In FIGURE 1, a pulse generator 10 alternately generates first and second pulses of different time duration such as 1 μsec. and 10 μsec. at a predetermined repetition rate such as 1 kc. The pulses are fed to a transmitting coil 12 housed in an attenuating mask 14. A detailed description of the mask 14 and its operating characteristics will be given at a later time. The output from the transmitting coil 12, a series of alternating long and short pulsed electromagnetic fields, is transmitted through the aperture 16 of the mask 14 into the metal sample 18.

As the long pulsed electromagnetic fields enter the sample 18, a large portion of the energy thereof will be reflected by the surface of the metal sample 18. The remainder of the pulsed electromagnetic field will enter the metal sample, where a portion of the energy thereof will again be reflected by the far side of the metal sample 18 and any discontinuities therein. As the short pulsed electromagnetic fields impinge on the metal sample 18, their depth of penetration into the sample 18 is limited to the surface area thereof due to the well-known high-frequency skin effect, and the reflected pulsed electromagnetic fields therefrom will be generated primarily by the surface of the metal sample 18. It is to be noted that low-frequency components comprise the greater percentage of the energy in the long pulses and that high-frequency components comprise the greater percentage of the energy of the short pulses, wherefrom the pulses exhibit their differing depths of penetration into metal sample 18.

Two typical reflected pulse envelopes are shown in FIGURE 2. The pulse 20 is the reflected waveform from the long pulsed electromagnetic field as it traverses the metal sample 18. The positive portion of the waveform of pulse 20 primarily contains the reflected signal from the surface of the metal sample 18. Reflected signals from subsurface flaws in the metal sample are primarily contained about the portion of the waveform 20 that crosses the zero axis (for example, as shown by portion 21 in FIG. 2), and reflections from the opposite side of the metal sample 18 are contained in the negative portion of the waveform 20. Dependent upon the depth of subsurface flaws in the metal sample, the point at which the waveform crosses the zero will vary and a more pronounced effect will be noticed in the positive or negative portions of the waveform 20. However, it has been found that regardless of the depth of the flaw in the metal sample its presence may be detected by analysis of the negative portion of the waveform 20.

Waveform 22 illustrates a typical reflected waveform from the short pulsed electromagnetic field as it impinges on the metal sample 18.

A receiving coil 24 mounted in the mask 14 detects the reflected signals from the metal sample and transmits them to a preamplifier 26. The detected signals from the long and short pulsed fields are then amplified by amplifier 28 and fed to a gate separator 30.

When the long and short pulses are generated by the pulse generator 10, a reference gating pulse is simultaneously generated therefor and transmitted to the gate separator 30. The reference gating pulses are used in the gate separator 30 to gate the long and short pulse reflected signals into separate channel outputs 32 and 34 of the gate separator 30. The gate separator 30 further operates on the long and short pulse reflected signals so that the outputs 32 and 34 therefrom are demodulated time varying A.-C. signals having equal amplitudes in the absence of subsurface flaws in the metal sample 18. Further description of the gate separator 30 will be given later.

The outputs 32 and 34 of the gate separator 30 are fed to a mixer 36 where they are subtracted from each other. It is to be noted that, though there is a time phase difference between the outputs 32 and 34 of the gate separator 30, such a phase difference is negligible when compared to the duration of the signal received from subsurface flaws or probe-to-sample spacing variation and therefore the outputs 32 and 34 of the gate separator 30 may practically be subtracted from each other without being completely in phase. Thus, the output from the mixer 36 is zero in the absence of subsurface flaws in the metal sample 18 and an output will be detected therefrom only with the presence of a subsurface flaw of the metal sample 18. The output from the mixer is independent of mask 14 to sample 18 spacing since the signal from the short pulse reflected field will cancel any variations received therefrom. The output from mixer 36 is fed to a suitable detector 37, such as an oscilloscope or recorder.

FIGURE 3 illustrates the operation of the amplifier 28 and the gate separator 30. The output from the preamplifier 26 is fed to the primary 38 of a pulse transformer 40. The secondaries 42 and 44 of the transformer 40 are connected so that when point A of secondary 42 is positive with respect to ground (points B and C), point D of secondary 44 is negative with respect to ground. Thus, the output A of secondary 42 will be in phase with the input to primary 38 and the output D of secondary 44 will be 180° out of phase with respect thereto. The outputs A and D from the transformer secondaries 42 and 44 are connected via variable resistors 46 and 48 to the control grids 50 and 52 of voltage amplifiers 54 and 56. Voltage amplifiers 54 and 56 and transformer 40 comprise the amplifier 28 of FIGURE 1.

The outputs from voltage amplifiers 54 and 56 are R-C coupled to the control grids 58 and 60 of gating pentodes 62 and 64 respectively. When a short pulse is generated by the pulse generator 10 of FIGURE 1, a reference gating pulse is also generated. This reference gating pulse is transmitted to the suppressor grid 66 of gating pentode 62 where it gates the pentode 62 and allows only the short pulse reflected signal generated by the transmitted short pulse to pass therethrough. Similarly, when a long pulse is generated by the pulse generator 10 of FIGURE 1, a reference gating pulse is also generated. This reference gating pulse is transmitted to the supressor grid 68 of gating pentode 64 where it gates the pentode 64 and allows only the long pulse reflected signal generated by the transmitted long pulse to pass therethrough.

The outputs of the gating pentodes 62 and 64 are fed through blocking capacitors 70 and 72 and voltage dividers 74 and 76 to the control grids 75 and 77 of power amplifiers 78 and 80. The outputs of the power amplifiers 78 and 80 are fed through capacitors 82 and 84 to the plates 86 and 88 of diodes 90 and 92. The diode 92 rectifies only the positive portion of the long pulse reflected signal (which is the negative portion of waveform 20 shown in FIGURE 2), and the output taken therefrom across the variable resistor 94 of the R-C network 96 is essentially a demodulated time varying A.-C. signal. Similarly the diode 90 rectifies the positive waveform of the short pulse reflected signal (shown as waveform 22 in FIGURE 2), and the output taken therefrom across the variable resistor 98 of the R-C network 100 is essentially a demodulated time varying A.-C. signal.

Variable resistors 94 and 98 are also used to balance the output signals from the R-C networks 96 and 100 so that the outputs are equal in amplitude when no subsurface irregularities exist in the metal sample 18.

The design of the attenuating mask 14 is illustrated in FIGURES 4, 5, and 6. In general, the mask 14 is semicylindrical in shape having a conically shaped base section 102 with an aperture 16 therein.

The mask 14 is first constructed as a circular cylinder of approximately 1″ in diameter having a conical shaped base with an angle of generation of approximately 10 degrees. An aperture 16 is drilled through the center of the base. The shape of the aperture 16 conforms to a series of truncated cones each having successively decreasing angles of generation and is terminated in a straight section 104 having a diameter of approximately 1/16 of an inch.

The cylinder is then sliced off-center so that the aperture 16 essentially remains intact and a flat piece 106 of the same material as the mask 14 is bonded to the cylinder walls to give essentially the semicylindrical shape to the mask 14. The base of the flat piece 106 is shaped to conform with the conical configuration of the base section 102.

The material of the mask 14 should be a conductor having electrical conductivity equal to or better than copper. The thickness of the material necessarily depends upon the pulse lengths employed since no energy should be transmitted through the walls thereof. It should be noted that the straight section 104 of the aperture 16 should not be less than 1/64 of an inch in height so that maximum resolution for the apparatus may be maintained.

A flat piece of high $\mu$ steel 108 is electrically bonded to the flat piece 106 of the mask 14. The base of the high $\mu$ steel 108 is shaped to conform to the slope along the diametrical axis of the conic base 102 of the mask 14. A slot 110 is cut into the base of the high $\mu$ steel 108 slightly displaced (approximately 1/4″) from the aperture 16 of mask 14 along the diametrical axis thereof. The axis of the transmitting coil 12 is positioned off-center with respect to the aperture 16 so that a net energy flow of the electromagnetic field from the transmitting coil 12 may be transmitted therethrough. The receiving coil 24 is mounted in the slot 110 of the high $\mu$ steel 108 at an angle such that its axis is parallel to the angle of generation of the conic base 102.

In operation, the mask 14 permits a narrow high energy pulsed electromagnetic field to be delivered to the metal sample 18 which is passed under the aperture 16 along the diametrical axis of the base 102, which is into the paper for the sample 18 in FIGURE 1. The conical taper of the base 102 of the mask 14 cuts down on the number of stray flux paths which would be present if the base 102 were flat and thereby reduces losses in the face of the base 102 of mask 14. Further, the conical taper of the base 102 permits accurate flaw detection to the end of the metal sample 18 as it passes thereunder due to the minimal presence of stray flux paths.

The high $\mu$ steel piece 108 in which the receiving coil 24 is mounted further increases the resolution of the apparatus by providing a low reluctance path for any stray flux fields which may be present.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

What is claimed is:

1. A device for detecting subsurface irregularities in a metal sample comprising a transmitting coil mounted adjacent one side of said metal sample, means for applying alternate long and short duration pulses to said transmitting coil, high-reluctance means for shielding said transmitting coil to cause only a portion of the pulsed electromagnetic fields resulting from said long and short pulses applied to said transmitting coil to be transmitted therefrom to said metal sample, a receiving coil mounted adjacent said transmitting coil and aligned to detect the reflected electromagnetic fields from said metal sample due to said transmitted pulsed electromagnetic fields, and means for discriminating from said detected reflected electromagnetic fields the reflected electromagnetic fields caused by subsurface irregularities in said metal.

2. The device according to claim 1 wherein said shielding means comprise an essentially semicircular cylinder surrounding said transmitting coil, the base of said cylinder having an aperture therein to permit only a portion of the pulsed electromagnetic fields resulting from said long and short pulses applied to said transmitting coil to be transmitted therethrough, said semicircular cylinder having walls of sufficient thickness and electrical conductivity to absorb the energy of the pulsed electromagnetic fields from said transmitting coil.

3. The device according to claim 2 wherein the base of said cylinder has essentially a conical shape, and the aperture in said base passes through the apex thereof and has a general conical shape.

4. The device according to claim 3 wherein the angle of generation of said conically shaped base is approximately 10 degrees, and the shape of the aperture in said base conforms to a series of truncated cones each having successively decreasing angles of generation and is terminated in a straight section having a diameter of approximately 1/16 of an inch and a height of no less than 1/64 of an inch.

5. A device for detecting subsurface irregularities in a metal sample comprising a transmitting coil mounted adjacent one side of said metal sample, means for applying alternate long and short duration pulses to said transmitting coil, an essentially semicircular cylinder surrounding said transmitting coil, the base of said cylinder having a conical shape and an aperture therethrough at the apex thereof to permit only a portion of the pulsed electromagnetic fields resulting from said long and short pulses applied to said transmitting coil to be transmitted therethrough, said semicircular cylinder having walls of sufficient thickness and electrical conductivity to absorb the energy of the pulsed electromagnetic fields from said transmitting coil, a high $\mu$ steel plate mounted adjacent the flat longitudinal wall element of said cylinder and electrically connected thereto, the shape of said steel plate essentially conforming to the shape of the flat longitudinal wall element of said cylinder, said steel plate having a slot cut in the bottom surface thereof adjacent the aperture of said cylinder, the slot in said steel plate being displaced from the aperture of said cylinder approximately 1/4 of an inch along the diametrical axis thereof, a receiving coil mounted in the slot of said steel plate, said receiving coil detecting the reflected electromagnetic fields from said metal sample due to said transmitted pulsed electromagnetic fields, and means for discriminating from the detected reflected electromagnetic fields the reflected electromagnetic fields caused by subsurface irregularities in said metal.

6. The device according to claim 5 wherein said discriminating means comprise means for separating the long and short received pulse signals, means for demodulating the separated long and short received pulse signals, and means for measuring the amplitude difference between the demodulated long and short pulse signals.

7. The device according to claim 6 wherein said demodulating means pass only the negative cycle portion of said long received pulse signals, and further including means for initially balancing the amplitude of the demodulated long and short received pulse signals to be equal when no subsurface flaws are present in said metal sample.

References Cited by the Examiner

UNITED STATES PATENTS

| Re. 18,889 | 7/1933 | Sams et al. | 324—37 |
| 2,162,710 | 6/1939 | Gunn | 324—37 |
| 2,933,677 | 4/1960 | Lieber | 324—40 |
| 2,965,840 | 12/1960 | Renken et al. | 324—37 |

RICHARD B. WILKINSON, *Primary Examiner.*

WALTER L. CARLSON, *Examiner.*

R. E. KLEIN, *Assistant Examiner.*